United States Patent
Muthuswamy et al.

(10) Patent No.: US 8,767,754 B1
(45) Date of Patent: Jul. 1, 2014

(54) METHOD AND APPARATUS FOR PROVIDING DISTRIBUTED LOAD BALANCING OF SUBSCRIBER SESSIONS IN A MULTI-SLOT GATEWAY

(75) Inventors: Sridharan Muthuswamy, Cupertino, CA (US); Santhosh Kumar Thodupunoori, San Jose, CA (US)

(73) Assignee: WiChorus, Inc., Naperville, IL (US)

( * ) Notice: Subject to any disclaimer, the term of this patent is extended or adjusted under 35 U.S.C. 154(b) by 104 days.

(21) Appl. No.: 13/453,754

(22) Filed: Apr. 23, 2012

(51) Int. Cl.
    *H04L 12/54* (2013.01)

(52) U.S. Cl.
    USPC ............ 370/401; 370/237; 370/252; 370/420

(58) Field of Classification Search
    None
    See application file for complete search history.

(56) References Cited

U.S. PATENT DOCUMENTS

| | | | | |
|---|---|---|---|---|
| 6,173,306 B1 * | 1/2001 | Raz et al. | | 718/102 |
| 6,272,136 B1 * | 8/2001 | Lin et al. | | 370/392 |
| 6,985,464 B2 * | 1/2006 | Harper et al. | | 370/331 |
| 7,840,683 B2 * | 11/2010 | Zhang | | 709/227 |
| 2003/0223466 A1 * | 12/2003 | Noronha et al. | | 370/537 |
| 2004/0047286 A1 * | 3/2004 | Larsen et al. | | 370/216 |
| 2006/0187838 A1 * | 8/2006 | Alex et al. | | 370/235 |
| 2011/0085439 A1 * | 4/2011 | Chandrachood et al. | | 370/216 |
| 2011/0087786 A1 * | 4/2011 | Chandrachood et al. | | 709/226 |
| 2013/0163463 A1 * | 6/2013 | Grayson et al. | | 370/253 |

\* cited by examiner

*Primary Examiner* — Donald Mills
(74) *Attorney, Agent, or Firm* — James M. Wu; JW Law Group (57) ABSTRACT

A method and apparatus for providing load balancing of subscriber session in a multi-slot gateway employing utilization counts are disclosed. A process of load balancing is configured to increase the session count when a subscription or subscriber session is created in a line card coupled with an active slot. The utilization count associated with the active slot is incremented when the value of session count reaches a predefined session value such as 100,000. After updating an active slot table associated with the active slot in accordance with slot numbers and utilization counts, the content of active slot table is copied to another active slot table associated with a second active slot.

20 Claims, 7 Drawing Sheets

METHOD AND APPARATUS FOR PROVIDING DISTRIBUTED LOAD BALANCING OF SUBSCRIBER SESSIONS IN A MULTI-SLOT GATEWAY

FIELD

The exemplary embodiment(s) of the present invention relates to communications network. More specifically, the exemplary embodiment(s) of the present invention relates to load balancing for network sessions.

BACKGROUND

With rapid growth of mobile data transfer over a high-speed communication network such as 3G or 4G cellular services, authenticating, load balancing, and controlling such data transfer become increasingly difficult and complicated. A conventional network layout includes Internet, LAN (local area network), and wireless networks having hundreds of network devices such as access switches, routers, and bridges for facilitating data delivery from source devices to destination devices. Authenticating and transferring massive amount of data efficiently between wireless portable devices such as smart phones and/or laptops over a typical and/or standard network becomes increasingly challenging.

In a multi-slot network gateway such as an LTE/GGSN (long term evolution/a gateway GPRS support node) gateway, subscriber sessions are distributed across the slots for load sharing. To handle mandatory IE (information element) in creating session and PDP (packet data protocol) request, a conventional approach for load sharing is to hash IMSI(s) (international mobile subscriber identity) to determine the next slot(s) for hosting the subscriber session(s). To expand system capacity, additional line cards may be inserted or plugged into empty slots in a multi-slot chassis using a plug-and-play mechanism whereby rebooting of the system to activate newly inserted line card(s) is not necessary.

A problem, however, associated with the conventional load sharing approach is that using the traditional IMSI hashing method to identify slots often results in session drop. For example, in an N slots chassis (where N can be any integer between $1<=N<=12$) wherein each slot is capable of supporting up to one (1) million subscriber sessions. Adding a new line card to an empty slot may still drop subscriber sessions partially because of lack of load balancing. For instance, assuming IMSIs are randomly distributed, a conventional IMSI hash generates a distributed $1/(N+1)$ million subscribers to every active slot regardless of their current capacity. If a line card is plugged into N+1th slot, the original active slots (1, 2 . . . N) may drop new subscriber sessions because they are already at maximum capacity. As such, while $1/(N+1)$ million subscribers sessions may be processed and handled successfully by the N+1th slot, $N/(N+1)$ million subscribers' sessions may be dropped by the other slots (1, 2, . . . , N).

Another problem associated with the conventional load sharing approach is that active slots reach their maximum capacity at different pace and time. Although IMSIs are randomly distributed and hashed, all available cards are not necessary to be filled up at the same time. For instance, if slot one (1) reaches its maximum capacity, any further session creation requests will be dropped, although slots other than slot one have not reached their maximum limit yet.

SUMMARY

A method and/or multi-slot gateway, in one embodiment, uses an active slot table to provide load balancing for various active slots. A process of load balancing is capable of increasing a session count when a subscription or subscriber session is created in the line card which is plugged into an active slot. The utilization count associated with the active slot is incremented when the value of session count reaches a predefined session value such as 50,000 or 100,000. After updating an active slot table associated with the active slot in accordance with slot numbers and utilization counts, the content of active slot table is copied to another active slot table associated with another active slot.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Exemplary embodiment(s) of the present invention is described herein in the context of a method, device, and apparatus for providing load balancing between multiple slots in a network gateway using active slot tables.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

Unless otherwise defined, all terms (including technical and scientific terms) used herein have the same meaning as commonly understood by one of ordinary skills in the art to which the exemplary embodiment(s) belongs. It will be further understood that terms, such as those defined in commonly used dictionaries, should be interpreted as having a meaning that is consistent with their meaning in the context of the relevant art and this exemplary embodiment(s) of the disclosure.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

The term "system" is used generically herein to describe any number of components, elements, sub-systems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

IP communication network, IP network, or communication network means any type of network having an access network able to transmit data in the form of packets or cells, such as ATM (Asynchronous Transfer Mode) type, on a transport medium, for example, the TCP/IP or UDP/IP type. ATM cells are the result of decomposition (or segmentation) of packets of data, IP type, and those packets (here IP packets) comprise an IP header, a header specific to the transport medium (for example UDP or TCP) and payload data. The IP network may also include a satellite network, a DVB-RCS (Digital Video Broadcasting-Return Channel System) network, providing Internet access via satellite, or an SDMB (Satellite Digital Multimedia Broadcast) network, a terrestrial network, a cable (xDSL) network or a mobile or cellular network (GPRS/EDGE, or UMTS (where applicable of the MBMS (Multimedia Broadcast/Multicast Services) type, or the evolution of the UMTS known as LTE (Long Term Evolution), or DVB-H (Digital Video Broadcasting-Handhelds)), or a hybrid (satellite and terrestrial) network.

Information pertaining to the transfer of packet(s) through a network is embedded within the packet itself. Each packet traveling through one or more communications networks such as Internet and/or Ethernet can be handled independently from other packets in a packet stream or traffic. For example, each router, which may include routing, switching, and/or bridging engines, processes incoming packets and determines where the packet(s) should be forwarded.

A multi-slot network gateway, in one embodiment, is able to improve system efficiency through load balancing between active slots. The multi-slot network gateway, in one aspect, is a LTE and/or GGSN gateway. A gateway is able to provide a process of load balancing capable of increasing a session count when a subscription or subscriber session is created in a line card coupled or plugged in an active slot. A utilization count which is associated with an active slot is incremented when the value of session count reaches a predefined value such as 50,000 or 100,000. In one embodiment, each active slot contains an active slot table indicating the current status of the slot. After updating an active slot table according to the slot numbers and the utilization counts, the content of active slot table is populated to the rest of active slot tables.

Figure 1:
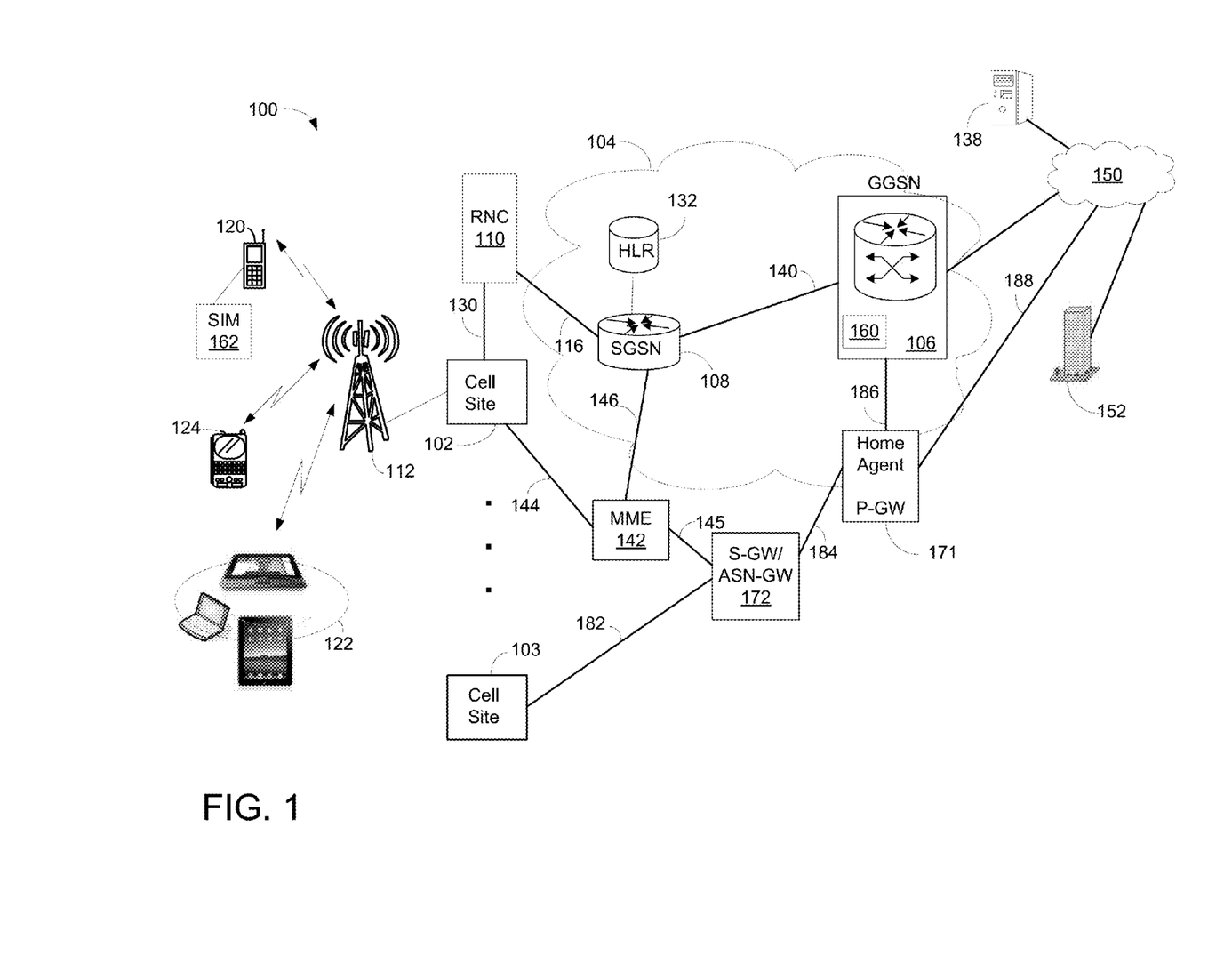
FIG. 1 is a block diagram illustrating a network configuration having one or more network devices able to provide load balancing between multiple slots in accordance with one embodiment of the present invention.

FIG. 1 is a block diagram 100 illustrating a network configuration having one or more network devices able to provide load balancing between active slots in accordance with one embodiment of the present invention. Diagram 100 illustrates cell sites 102-103, switching network 104, network nodes 106-108, mobility management entity ("MME") 142, radio network controller ("RNC") 110, serving gateway ("S-GW") 172 and packet data network gateway ("P-GW") or HomeAgent 171. Node 106 is also coupled to Internet, wide area network ("WAN"), or virtual private network ("VPN") 150. Internet, WAN, or VPN 150 provides network communication between node 106 and network devices such as server 138 and service provider(s) or subscription partner 152. Subscription or service provider 152, in one aspect, can be a wireless carrier responsible for monitoring and managing user subscriptions. Server 138 may be a remote network server used for providing network policy. It should be noted that the underlying concept of the exemplary embodiment(s) of the present invention would not change if one or more blocks (or devices) were added to or removed from diagram 100.

The network configuration illustrated in diagram 100 may also be referred to as a third generation ("3G"), fourth generation ("4G"), LTE (long term evolution), or combination of 3G and 4G cellular network configurations. MME 142, in one aspect, is coupled to cell site 102 and S-GW 172 via connections 144-145 and facilitates data transfer between 3G and LTE or between 2G and LTE (or 4G). In LTE (or 4G) network environment, MME 142 performs various controlling/managing functions, such as UE (user equipment) idle mode for tracking, paging, and retransmitting activities. MME 142 also provides network security management as well as resource allocations. To access packet based and/or IP based networks, MME 142, in one aspect, is able to reach other networks such as Ethernet and/or Internet via S-GW 172 and P-GW 171.

S-GW 172, in one example, is coupled to MME 142 and cell site 103 via connections 145 and 182, and is capable of routing data packets from cell site 103 (eNodeB) or MME 142 or P-GW 171 via connections 145 and 184. Note that S-GW 172 can couple to additional network elements such as additional MMEs and/or base stations. In an evolved packet core ("EPC") network environment, S-GW 172 can also be used to perform an anchoring function for mobility between 3G and 4G equipments. S-GW 172, in one aspect, performs various network management functions, such as authenticating device identity, terminating paths, paging idling UEs, storing data, routing information, generating replica, and the like.

P-GW 171, which is also known as Home Agent, is coupled to S-GW 172, GGSN 106, and Internet 150 via connections 184-188, wherein P-GW 171 is able to provide network communication between an UE and IP based networks such as Internet 150. P-GW 171 is used for connectivity, packet filtering, inspection, data usage, billing, PCRF (policy and charging rules function) enforcement, et cetera. P-GW 171 also provides an anchoring function for mobility between 3G and 4G (or LTE) packet core network(s). Note that P-GW 171 could be merged into GGSN 106 as a single NE or node. Alternatively, P-GW 171 is able to directly route data between UEs via Internet 150.

Switching network 104, which may also be referred to as packet core network, includes nodes 106-108 and a home location register ("HLR") 132, wherein network 104 routes packet traffic between cell sites 102-103 and Internet 150. For example, node 108 transmits information between cell site 102 and HLR 132 via connections 116 and 130. Node 106 transmits information to (and receives information from) cell site 102 via connections 140, 116, and 130. Cell sites 102-103 may be referred to as radio access networks. Switching network 104, in one aspect, includes IP and/or Multi Protocol Label Switching ("MPLS") based network capable of operating at a layer of Open Systems Interconnection Basic Reference Model ("OSI model") for information transfer between clients and network servers. It should be noted that a different network architecture or configuration may be implemented for 3G, 4G, or 5G cellular networks with different layout of network elements, and/or differently named network elements, but the underlying concept of exemplary embodiment would not change.

Node 106, in one aspect, is a gateway GPRS support node ("GGSN") wherein GPRS refers to general packet radio service. GGSN 106 may include one or more routers or switches capable of managing, monitoring, and routing network traffic or network flows between sources and destinations. Network flow or packet flow, in one example, is data traffic traveling through the network between source and destination. Network node or GGSN 106, hereinafter referred to as GGSN, can also be a router, Access Service Network Gateway ("ASN-GW"), Packet Data Network Gateway ("PDN-GW"), serving gateway, switch, hub, or a combination of router, Access Service Network Gateway, P-GW, S-GW, switch, and/or line card.

Node 108, in one aspect, is a serving GPRS support node ("SGSN") capable of authenticating portable wireless UEs, subscribers, registering mobile devices, collecting network usage information, et cetera. A function of SGSN 108 is to adjust quality of service by activating or deactivating users' or subscribers' sessions. While SGSN 108 tracks and/or controls mobile communication, GGSN 106 handles, inspects, and routes information and/or packet traffic between mobile terminal(s) and intended destination(s). Alternatively, SGSN 108 is connected to MME 142 which is also able to route packet streams to/from LTE network. It should be noted that node 108 can be SGSN, MME, and/or a combination of SGSN and MME.

RNC 110 may be coupled to other network elements such as a second RNC or PCU (packet control unit), not shown in FIG. 1, to enhance network management and communication. Connections 116 and 140 are used to facilitate communication between RNC 110 and nodes 106-108. RNC 110, in one example, provides network management for controlling NEs in UMTS (universal mobile telecommunications system) radio access network ("UTRAN") and base stations that are connected to it.

Cell site 102, also known as base station, node B, or eNodeB, includes a radio tower 112. Radio tower 112 is further coupled to various subscribers or UEs, such as a cellular phone 120, a handheld device 124, tablets and/or iPad® 122 via wireless communications. Handheld device 124 can be a smart phone, such as iPhone®, BlackBerry®, Android®, and so on. In one aspect, handheld devices 120-124 store their IMSIs in their SIM cards such as SIM 162. Cell site 102 facilitates network communication between mobile devices such as handheld device 124 and iPad® 122 via radio tower 112. It should be noted that cell site 102 may include additional radio towers as well as other land switching circuitry.

In a wireless mobile network environment, a mobile device or subscriber, in one example, uses information stored in an IMSI to authenticate and/or access wireless networks as well as wired networks for transporting information. To establish a session(s) or link(s) for information and/or packets transfer between a mobile device and its destination(s) via a core network such as general packet radio service ("GPRS") core network, the mobile device is typically authenticated using IMSI information before a link or session can be established. To process and/or classify IMSI and/or packet(s) information associated with a mobile device, a data structure is used to store various classification rules in connection to IMSIs and/or packet addresses whereby communication between a mobile and its destination, for example, can be processed quickly.

Referring back to FIG. 1, GGSN 106, in one embodiment, includes a load balance manager ("LBM") 160 configured to provide load balancing between multiple active slots resided in a chassis. LBM 160 distributes load amount to active slots to improve utilization of each slot to its full or almost full capacity. The terms "slot," "slot of chassis," "line card ("LC")," "LC in the slot," or "LC seated in slot" are referred to the same or substantially the same component. As such, the term "slot" and "LC" can be used interchangeably herein. In a high performance network environment, each LC seated in a slot of a gateway such as LTE/GGSN gateway can serve up to one (1) million mobile subscribers or handle up to 50 gigabytes ("GB") of data transfer or download. In 3G or 4G network environment for example, a chassis of a gateway is configured to house or host up to 14 LCs in 14 slots.

LBM 160 provides a mechanism of using a distributed table of active slots with utilization metrics (number of session creations) at the kernel of each slot. Kernel is a low level firmware or operating system running on an LC(s) or chassis. The updates for the distributed table, for example, can happen at one or more discrete watermark levels provisioned and/or initiated by user(s) or administer(s). It should be noted that the mechanism of load balancing based on utilization metrics may be applicable to data traffic load.

One advantage of using LMB 160 is to fully utilize each slot's capacity using active slot tables whereby the slots' capacities can be monitored in real or almost real-time.

Figure 2:
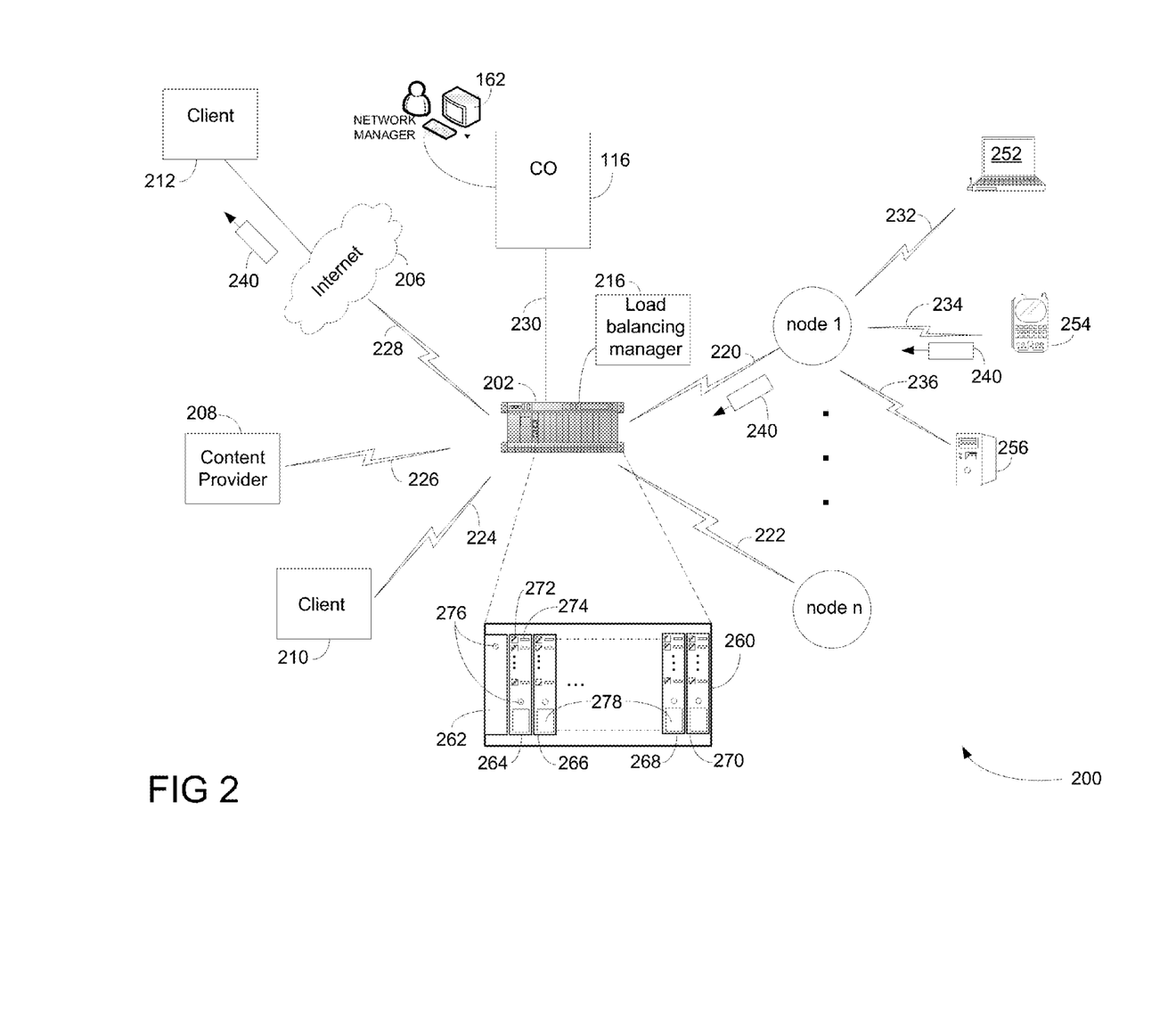
FIG. 2 is a block diagram illustrating an exemplary network system containing multiple line cards plugged in slots capable of providing load balancing between the line cards in accordance with one embodiment of the present invention.

FIG. 2 is a block diagram 200 illustrating an exemplary network system containing multiple LCs plugged in slots of a chassis capable of providing load balancing between the LCs in accordance with one embodiment of the present invention. Diagram 200 includes a network system ("NS") 202, CO 116, content provider 208, clients or end user 210-212, and various network nodes. Network nodes, also known as nodes, include node 1 through node n, where n can be any integer number. In a communications network, a physical network node or node can be an NE or a cluster of network devices, such as a router, modem, hub, bridge, switch, handset, computer, server, workstation, et cetera. Node 1, for example, can be a network entity capable of coupling to host 252, portable device 254, and server 256 via connections 232-236. It should be noted that the underlying concept of the exemplary embodiment(s) of the present invention would not change if one or more blocks (or devices) were added to or removed from diagram 200.

NS 202, which can be a node, router, or switch, is configured to direct or route packet flows between nodes and/or clients 210-212. A network manager or administrator 162 is able to communicate with NS 202 via CO 116. In one aspect, CO 116 is coupled to NS 202 via connection 230. Alternatively, CO 116 can be configured to reside within NS 202. NS (or router) 202 can also be configured to provide routing services to remote clients such as client 212 via Internet 206. Connections 220-228, which can be wired, wireless, or a combination of wired and wireless connections, are employed to connect NS 202 to clients 210-212, content provider 208, and nodes. Note that client(s) can be servers, routers, switches, computers, user's equipments, mobiles, network equipments, network elements, websites, and so forth.

NS 202, in one embodiment, is a GGSN having a chassis 260 containing a network processing card 262 (or control plane) and multiple LCs 264-270. Network processing card 262 including a power-on indicator 276 is configured to distribute incoming traffic to one of LCs 264-270 for packet processing and routing. Each of LCs 264-270, which contains multiple port connectors 272 and status indicators 274, is able to route packet flows to their destinations via one or multiple networks. Chassis 260, in one example, includes up to 14 slots capable of receiving, hosting, or seating 14 LCs. The LCs may include GGSNs, SGSNs, MMEs, or a combination of GGSN, SGSN, and/or MMEs. Depending on the applications, chassis 260 may include any number of LCs to carry out provisioned functions of NS 202. If the capability of NS 202 needs to be enhanced at a later time, new LC(s) can be plugged into any available empty slot(s).

In one embodiment, network processing card 262 is used to control, manage, and/or perform at least a part of LBM functions. For example, network processing card 262 distributes newly arrived session requests to one of LCs 264-270 based on the active slot tables. Network processing card 262, in one aspect, manages LCs 264-270 and controls the update(s) of active slot tables. Network processing card 262 can also be configured to be responsible for populating or synchronizing contents of all active slot tables residing in LCs 264-270. Alternatively, one of LCs 264-270 may be selected to implement LBM functions if network processing card 262 is not present in the chassis.

An advantage of using LBM 216 is to improve system efficiency and provide load balancing to reduce session drops.

Figure 3:
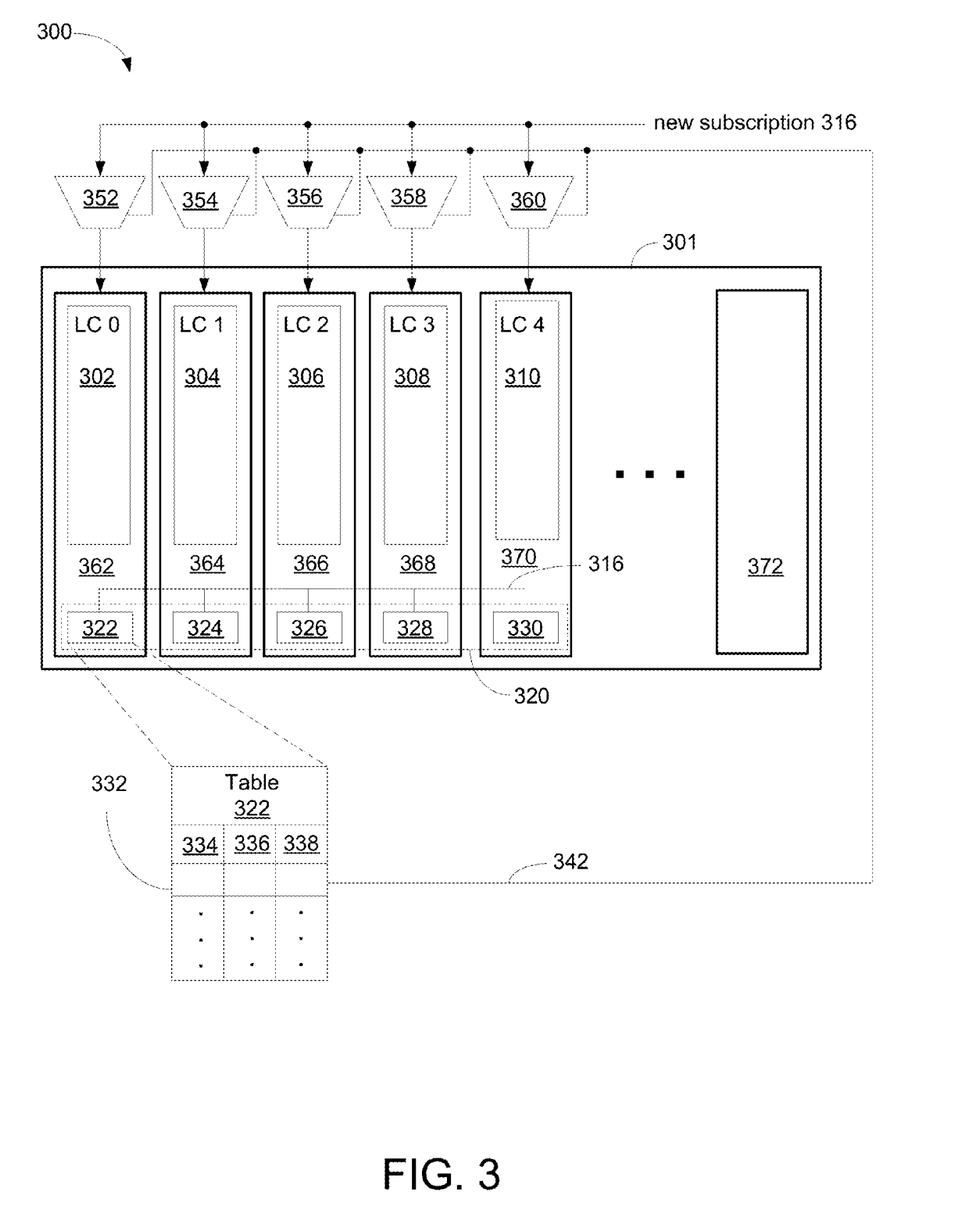
FIG. 3 is a block diagram illustrating a network device having multiple active slots capable of providing load balancing using active tables in accordance with one embodiment of the present invention.

FIG. 3 is a block diagram 300 illustrating a network device having multiple active slots capable of providing load balancing using active tables in accordance with one embodiment of the present invention. Diagram 300 includes a network device 301 and multiple selecting circuits 452-460, wherein device 301 includes slots status 320. In one aspect, selecting circuits 352-360 and status table 320 can be implemented in network device 301. It should be noted that the underlying concept of the exemplary embodiment(s) of the present invention would not change if one or more blocks (or devices) were added to or removed from diagram 300.

Network device 301 includes a single chassis configured to have multiple slots 362-372 and slots status 320. In one embodiment, network device 301 is a GGSN having 14 slots capable of housing up to 14 LCs 302-310. Depending on the applications, any number of LCs can be configured to perform designated functions of network device or GGNS 301.

The chassis, in one example, include active slots (with LCs) and non-active slots (empty slots) wherein the plug-and-play mechanism is employed to allow new LC(s) to be added to non-active slots without powering-down and then rebooting the system.

When an LC is plugged, seated, or inserted into a slot, the slot becomes an active slot capable of handling, for example, up to one (1) million active sessions and/or downloading/transferring up to 50-100 GB of data. For GGSN 301 to function, at least one active slot is required. Since no LC is plugged in slot 372, slot 372 is a non-active slot. Note that non-active slot or empty slot can be viewed as a reverse slot that can be activated later when the need arises.

Each LC, in one embodiment, includes a central processing unit ("CPU") and one or more packet processors, also known as network processors or packet processing engines. While CPU may be used to manage high-level functionalities of LC and/or communicate with other LCs in the chassis, the packet processor(s) is responsible to process and route data packets between established sessions. Packet processors are specialized in packets processing and packets routing whereby the packets can be processed at or near line rate.

Slots status 320, in one embodiment, includes active slot tables 322-330 connected via connection 316. Since slots 362-370 seated with LCs 302-310 are active slots, active slot tables 322-330 are dedicated to slots 362-370, respectively. It should be noted that non-active slot such as slot 372 does not contain an active slot table. Each of active slot tables 322-330, in one embodiment, is physically resided with the associated LC. For example, active slot table 322 which indicates loading status of LC 302 resides at slot 362. Alternatively, active slot tables 322-330 may be optionally managed and located in a centralized location such as in an LC or network processing card.

Table 322, in one embodiment, includes multiple columns 334-338 wherein column 334 contains slot numbers for all active slots. While column 336 contains utilization counts or metrics for all active slots, column 338 optionally contains amount of data download for all active slots. In one aspect, amount of data download recorded in column 338 is used to generate weighted utilization count for the active slots. The content of active slot tables 322-330 should be the same and are used to balance traffic loading between active slots 362-370.

The utilization count, in one embodiment, represents the usage or network loading of an associated LC. Network loading of an active slot, in one example, means that an LC receives, processes, and routes packets at a given time. For example, if an LC is configured to handle up to one (1) million active sessions or subscribers using PDP context, the utilization count may optionally set to a range between 1 and 20, where each increment represents 50,000 sessions (1 million/20) as a discrete unit. Note that discrete unit can be configurable by user or administrator. For example, discrete unit of a utilization count can be set to 10,000, 50,000, 100,000, et cetera depending on the applications. When discrete unit is set to 50,000 or 50K, the utilization count increases its count by one (1) for every 50K subscriber sessions created. The increment of utilization count, in one aspect, triggers an update of active slot tables. It should be noted that update of active slot tables occurs when the utilization count reaches a value of 1, 2, 3 . . . and 20.

To implement load balancing based on load status indicated by slot tables 322-330, firmware such as kernel residing on each slot may be used. The kernel, for example, is configured to maintain, sort, and update active slot tables for load balancing. The kernel is central part of an operating system or firmware that is used to bridge between applications and hardware. To create a subscriber session, a data structure based on PDP context is allocated in the SGSN and GGSN. Upon allocating the PDP context data structure in the SGSN, the GGSN is able to serve subscriber's access point. It should be noted that at the time of session creation, the load balance is performed based on load balancing data in an active slot table using the kernel or operating system.

During operation, upon acknowledging and receiving a new subscription 316 or subscriber session request, the load balancing process obtains an active slot table to identify the least loaded slot. The least loaded slot, in one aspect, should be listed on the top of column 334 if an ascending order is used and active slot tables are properly updated or sorted. After locating a sorted entry 332, the corresponding slot number at column 334 is fetched. Selecting circuits 352-360 selects a slot to handle new subscription 316 in response to the slot number listed in entry 332. Note that if an ascending sort approach is employed in updating the active slot table, the slot indicated by slot number listed at entry 332 at column 334 will be selected to receive new subscription 316.

Figure 4:
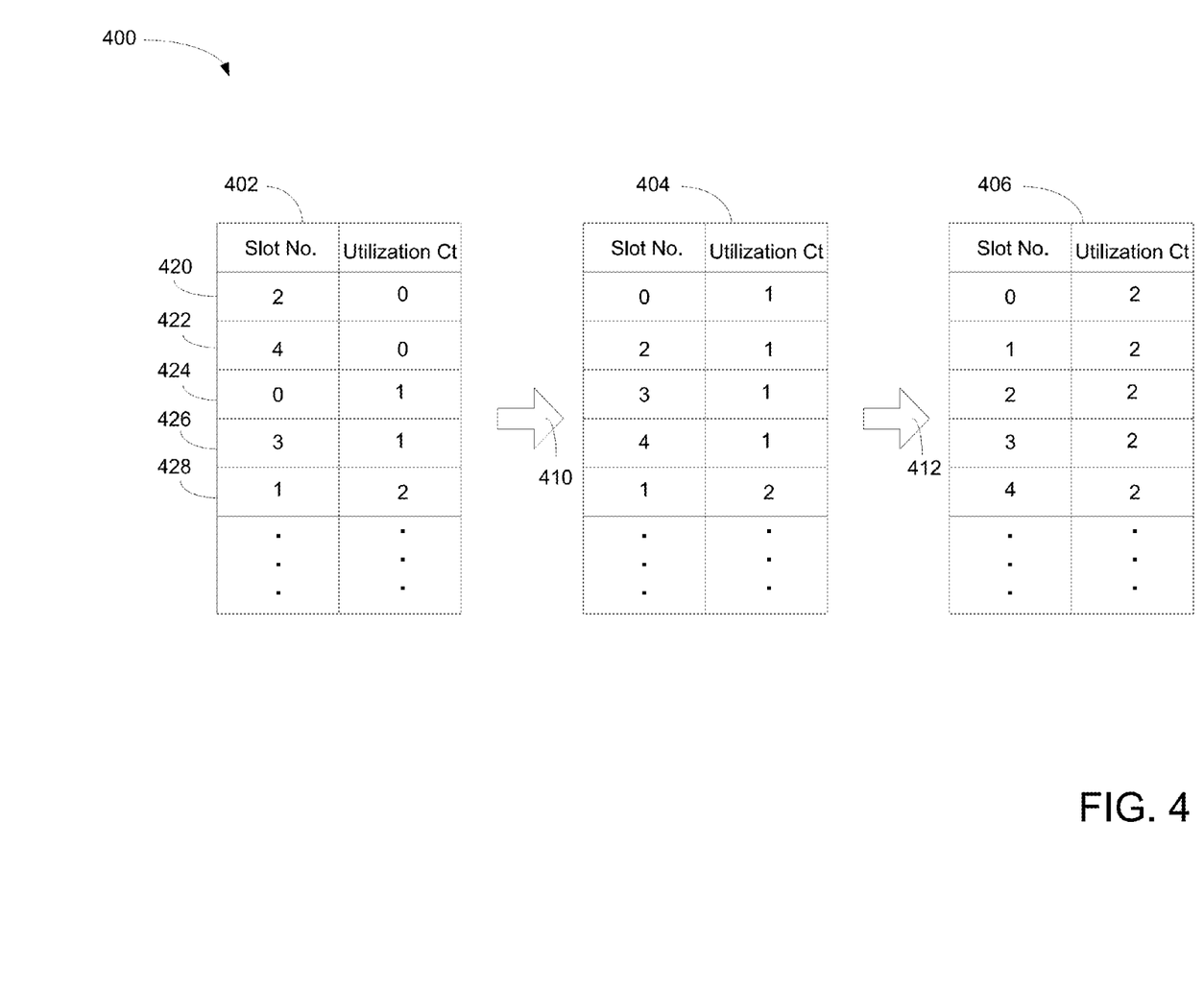
FIG. 4 is a logic block diagram illustrating a process of updating an active slot table used for load balancing in accordance with one embodiment of the present invention.

FIG. 4 is a block diagram 400 illustrating a logic process of updating an active slot table used for load balancing in accordance with one embodiment of the present invention. Diagram 400 is a simplified illustration for updating an active slot table through different phases as shown in tables 402-406. The illustration sorts content of table 402-406 in ascending order in accordance with utilization count. Upon completing update of utilization count, the table is sorted again based on slot numbers. To simplify the illustration, the utilization count is not weighted based on the amount of data downloading.

Table 402 illustrates five (5) active slots in a chassis of a network device and table 402 includes five (5) entries 420-428 to present the five active slots. After sorting based on utilization counts and slot numbers, the slot number column of table 402 is in an order of 2, 4, 0, 3, 1, while the utilization count column has an order of 0, 0, 1, 1, and 1. Each utilization count is set to equal to 50K sessions. According to table 402, slot numbers 2 and 4 are currently idling having the largest routing capacity. Each of slot numbers 0 and 3 is currently processing and routing packet traffics for roughly 50K sessions. Slot 1, on the other hand, is currently routing packets for approximately 100K sessions. Note that the table is sorted on every update.

Incoming requests of session creation are directed to the slot with the smallest utilization count. If multiple slots have the same utilization count, the distribution among them happens in a round robin fashion. Referring back to table 402, newly arrived sessions will be assigned to slots 2 and 4 until their utilization count becomes one (1). When utilization counts for both slots 2 and 4 changes to one (1), it triggers a table update of kernel load balancing. After sorting, the content of table 402 becomes the content of table 404, which includes [0,1], [2,1], [3,1], [4,1], [1,2]. The slot number column of table 404 is sorted in an order of 0, 2, 3, 4, 1 while the utilization count column is sorted in an order of 1, 1, 1, 1, and 2.

After phase transition as indicated by arrow labeled 410, new incoming sessions will be assigned to slots in an order of slots 0, 2, 3, and 4 until their utilization counts become two (2). A table update of kernel load balancing may be triggered when utilization counts for slots 0, 2, 3, and 4 reach two (2). After sorting, the content of table 404 becomes the content of table 406 as indicated by numeral 412. The sorted table 406 at this point would be [0,2], [1,2], [2,2], [3,2], [4,2]. The slot number column of table 406 is sorted in an order of 0, 1, 2, 3, 4, and the utilization count column is sorted in an order of 2, 2, 2, 2, and 2. At this point, session creations are load balanced to all slots in a round robin fashion.

The utilization metric, in one embodiment, is decremented when a group of subscriber sessions is deleted. For example, if the number of subscriber sessions on slot one (1) drops to or below a predefined watermark such as 45K, the utilization count is decreased by one (1) and the table is updated by the kernel load balance. To reduce unnecessary table updates due to sessions oscillating around utilization count (i.e., 50K per increment), a low watermark may be optionally configured. For example, watermark may be set to a percentage of a discrete unit. If the discrete unit is 50K, the watermark can be configured to be 10% of discrete unit. When the subscriber or session count falls below 45K which meets the 5K watermark, the utilization count is decremented which will trigger an update of active slot tables.

The kernel table update, in one embodiment, is triggered when utilization counts indicate that all active slots are full (utilization count=20). It should be noted that when all slots report maximum capacity (utilization count=20), it does not necessarily mean that subscriber sessions are all at 1 million on each slot because some subscriber sessions may have been deleted. Upon receipt of new session requests, updating of active slot tables may be requested even though the utilization counts for all active slots indicate full.

The exemplary aspect of the present invention includes various processing steps, which will be described below. The steps of the aspect may be embodied in machine, router, or computer executable instructions. The instructions can be used to create a general purpose or special purpose system, which is programmed with the instructions, to perform the steps of the exemplary aspect of the present invention. Alternatively, the steps of the exemplary aspect of the present invention may be performed by specific hardware components that contain hard-wired logic for performing the steps, or by any combination of programmed computer components and custom hardware components.

Figure 5:
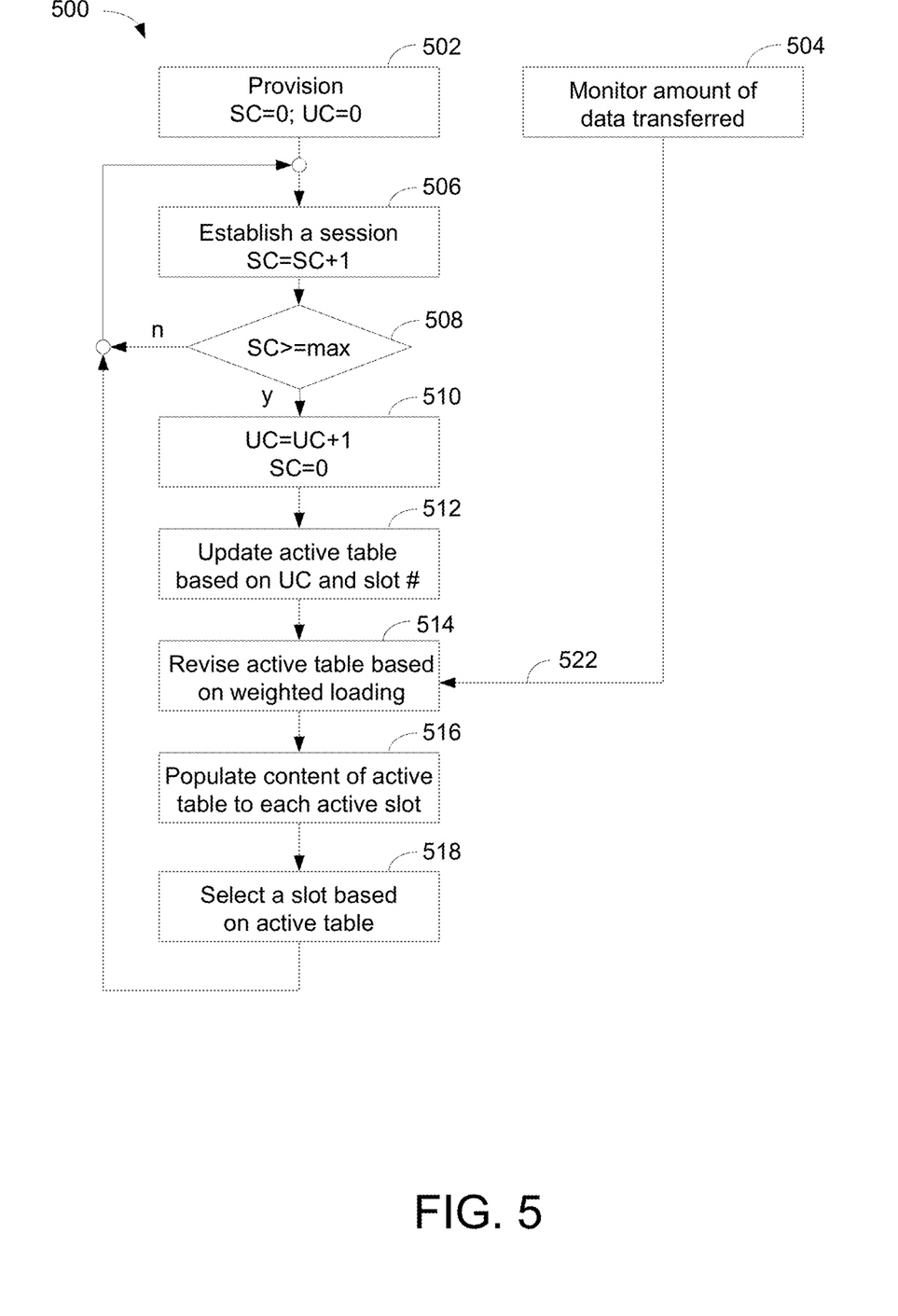
FIG. 5 is a flowchart illustrating a process capable of balancing load between active slots using utilization count in accordance with one embodiment of the present invention.

FIG. 5 is a flowchart 500 illustrating a process capable of balancing load between active slots using utilization count in accordance with one embodiment of the present invention. Upon initialization or provision of a new work device such as a GGSN, a session count ("SC") and a utilization count ("UC") are set to zero (0) at block 502. At block 506, SC is incremented (SC=SC+1) when a subscriber session is added to the current active slot for network services. Network services include receiving, processing, routing, and forwarding packet traffics. In one embodiment, the process, at block 504, employs a data-download aggregating module which is used to monitor the amount of data transferred for each session or slot.

It should be noted that a session for streaming a movie may use more bandwidth (download more data) than bandwidth used by multiple sessions for just email checking. In one example, an active slot can serve up to one (1) million sessions where each session on average downloads approximately 50K bytes of data (50K×1 million=50 GB of data) at a given time. As such, the increment of UC may be weighted based on bandwidth used.

The process, at block 508, exams whether SC is equal to or greater than a predefined maximum value such as 50K or 100K. If SC is equal to or greater than the predefined maximum value, the process proceeds to block 510. Otherwise, the process loops back to block 506. At block 510, the UC is incremented (UC=UC+1) and SC is reset to zero. The increment of UC, in one aspect, triggers an update of active slot tables. At block 512, the active slot table containing active slot numbers and utilization counts associated with all active slot numbers is sorted based on utilization counts and slot numbers.

In one embodiment, the process, at block 514, is capable of revising or updating content of active slot table with weighted values which are received from block 504 via connection 522. After populating the content of active table to the rest of active tables associated with active slots at block 516, a new slot which has the largest capacity amount to handle new network traffic is selected based on the active slot table. After block 518, the process loops back to block 506 to continue performing load balancing for the active slots.

Figure 6:
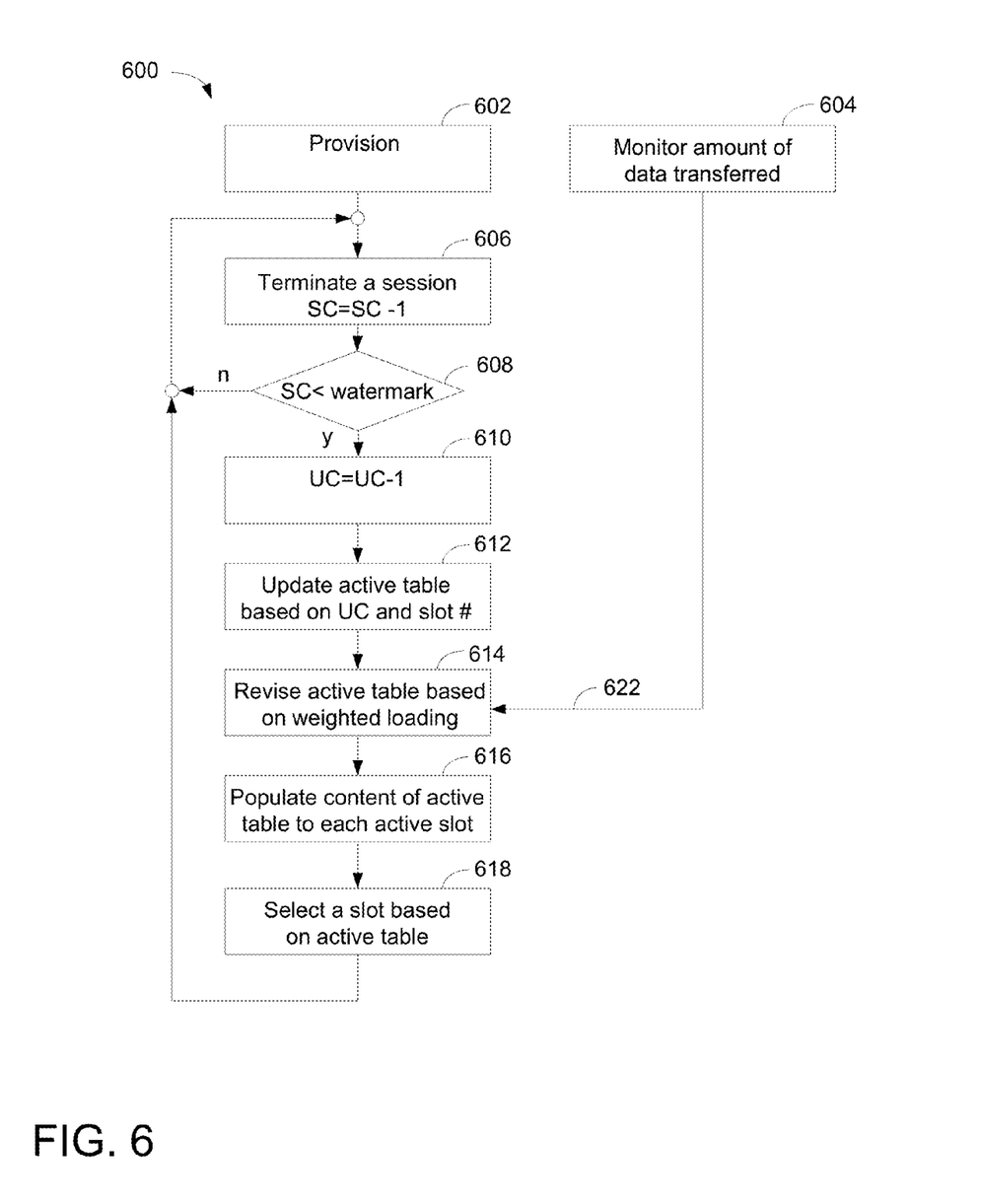
FIG. 6 is a block diagram illustrating a process able to balance the load between active slots using utilization count based on deletion of subscriber sessions in accordance with one embodiment of the present invention.

FIG. 6 is a block diagram 600 illustrating a process able to balance the load between active slots using utilization count based on deletion of subscriber sessions in accordance with one embodiment of the present invention. Upon initialization or provision at block 602, SC at block 606 is decremented (SC=SC−1) when a subscriber session is deleted or torn down at an active slot. In one embodiment, the process, at block 604, employs a data-download aggregating module which is used to monitor amount of data transferred for each session.

The process, at block 608, exams whether SC is less than a predefined threshold value, also known as watermark. If SC is less than the watermark, the process proceeds to block 610. Otherwise, the process loops back to block 606. At block 610, the UC is decremented (UC=UC−1) in response to the SC value and watermark. The change value of utilization count, in one aspect, triggers update of active slot tables. At block 612, the active slot table containing active slot numbers and utilization counts is updated. The process, at block 614, is capable of revising the content of active slot table with weighted values in response to the bandwidth usage via connection 622. After populating the content of active table to the rest of active tables at block 616, a new slot which has the largest capacity is selected based on the active slot table at block 618. The process subsequently loops back to block 606 for continuing performing load balancing.

Figure 7:
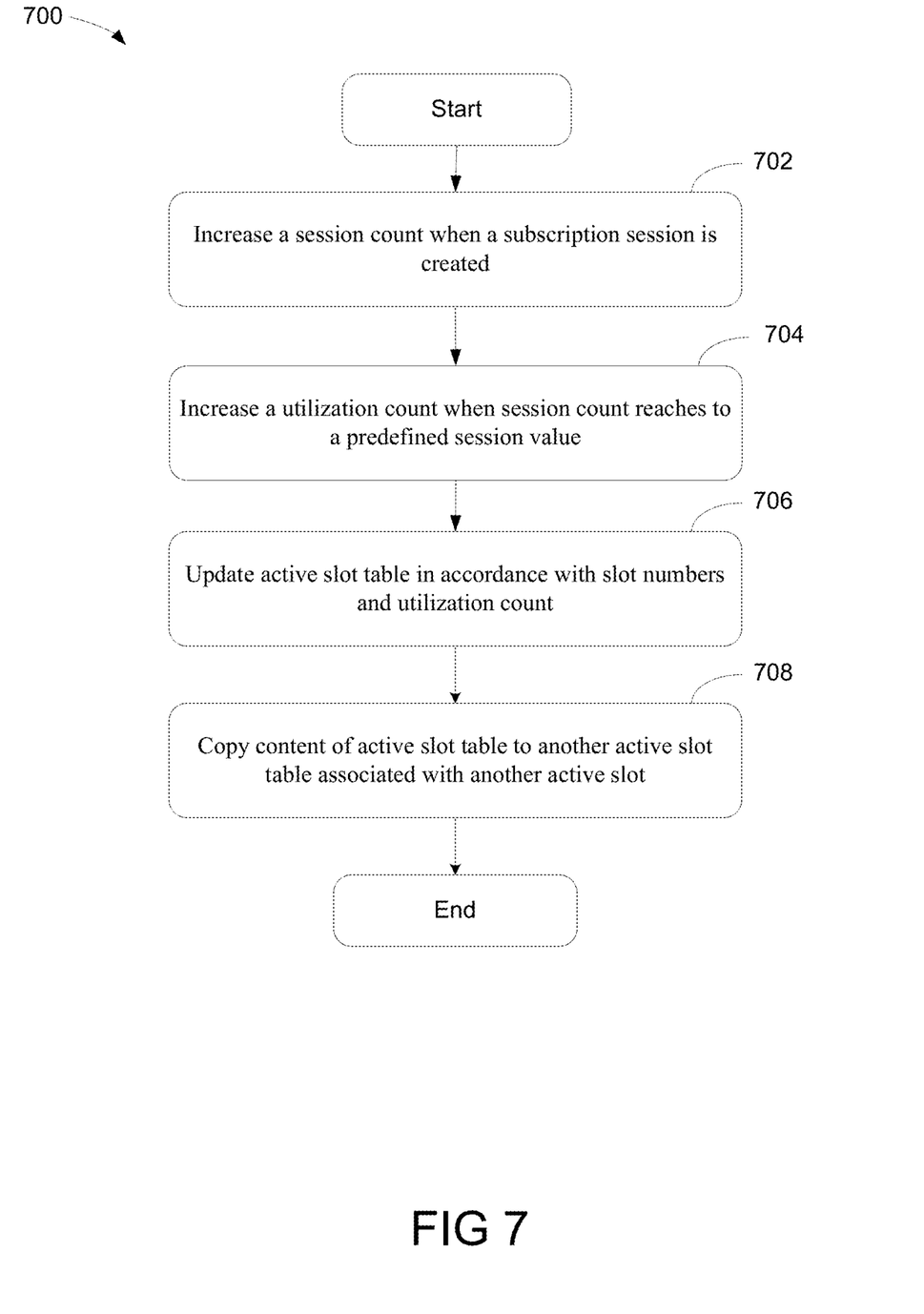
FIG. 7 is a flowchart illustrating an exemplary load balancing process of updating an active slot table in response to subscriber sessions in accordance with one embodiment of the present invention.

FIG. 7 is a flowchart 700 illustrating an exemplary load balancing process of updating an active slot table in response to subscriber sessions in accordance with one embodiment of the present invention. At block 702, the load balancing process increases the value of session count when a subscription session is created in a first LC which is coupled with a first active slot. In one aspect, a session is built based on a PDP context in accordance with a request from a subscriber. For example, the process adds one (1) to session count when a network connection is established at the GGSN. Alternatively, the session count is increased when a wireless communication is established at the SGSN.

At block 704, the value of first utilization count is increased when the session count reaches a predefined session value. For example, the first utilization count is increased by one (1) when the session count reaches 50K. After identifying the amount of data loading for each session in the first active slot, weighted utilization for the first active slot may be obtained in accordance with the session count and the amount of downloading for each active slot.

At block 706, a first active slot table associated with the first active slot is updated in accordance with slot numbers and utilization counts. For example, after identifying an active slot number and a utilization count associated with the active slot number in each entry of the first active slot table, the entries are sorted in accordance with utilization counts in an ascending order. The entries are subsequently sorted again in accordance with the slot numbers for entries having the same utilization count.

At block 708, the content of the first active slot table is copied or populated to a second active slot table associated with a second active slot. In one embodiment, the process is capable of populating content of the first active slot table to all active slot tables associated with active slots.

While particular embodiments of the present invention have been shown and described, it will be obvious to those of ordinary skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method for balancing network load, comprising:
increasing a session count when a subscription session is created in a first line card coupled with a first active slot;
increasing first utilization count associated with the first active slot when the session count reaches a predefined session value;
identifying a first active slot table in the first line card;
updating the first active slot table associated with the first active slot in accordance with a plurality of slot numbers and a plurality of utilization counts associated with the slot numbers; and
copying content of the first active slot table to a second active slot table located in a second line card coupled to a second active slot.

2. The method of claim 1, further comprising building a session based on packet data protocol ("PDP") context in accordance with a request from a subscriber.

3. The method of claim 2, wherein increasing a session count when a subscription session is created in a first line card includes adding one (1) to the session count when a network connection is established at a gateway GPRS support node ("GGSN").

4. The method of claim 2, wherein increasing a session count when a subscription session is created in a first line card includes increasing the session count when a wireless communication is established at a serving GPRS support node ("SGSN").

5. The method of claim 4, wherein increasing first utilization count associated with the first active slot when the session count reaches a predefined session value includes increasing the first utilization count when the session count reaches 50,000.

6. The method of claim 3, wherein increasing first utilization count associated with the first active slot includes:
identifying amount of data down loading for each session in the first active slot;
obtaining first weighted utilization for the first active slot in accordance with the session count and the amount of data down loading for each session; and
increasing the first utilization count in response to the first weighted utilization.

7. The method of claim 2, wherein updating a first active slot table associated with the first active slot includes:
identifying an active slot number and a value of a utilization count associated with the active slot number in each entry of the first active slot table; and
sorting a plurality of entries of the first active slot table based on the utilization counts in an ascending order.

8. The method of claim 7, wherein updating a first active slot table associated with the first active slot further includes sorting the plurality of entries of the first active slot table in accordance with the plurality of slot number when values of the utilization counts are same.

9. The method of claim 1, further comprising populating content of the first active slot table to all active slot tables associated with active slots.

10. A method for load balancing, comprising:
decreasing a session count when a subscription session is terminated in a first line card coupled with a first active slot;
decreasing first utilization count associated with the first active slot when the value of the session count falls below a predefined session value;
locating a first active slot table in the first line card;
updating the first active slot table associated with the first active slot in accordance with a plurality of slot numbers and a plurality of utilization counts associated with the slot numbers; and
copying content of the first active slot table to a second active slot table located in a second line card plugged in a second active slot.

11. The method of claim 10, wherein decreasing a session count when a subscription session is terminated includes subtracting one (1) from the session count when a network connection is torn down at a gateway GPRS support node ("GGSN").

12. The method of claim 10, where updating a first active slot table associated with the first active slot includes:
identifying an active slot number and a utilization count associated with the active slot number in each entry of the first active slot table; and
sorting a plurality of entries of the first active slot table in accordance with value of the utilization counts in an ascending order.

13. The method of claim 12, wherein updating a first active slot table associated with the first active slot further includes sorting the plurality of entries of the first active slot table in accordance with the plurality of slot number when values of the utilization counts are same.

14. The method of claim 10, further comprising populating content of the first active slot table to all active slot tables associated with active slots.

15. The method of claim 10, further comprising:
increasing the session count when a new subscription session is created in the first line card coupled with the first active slot; and
increasing the first utilization count associated with the first active slot when the value of the session count reaches the predefined session value.

16. The method of claim 10, wherein decreasing first utilization count associated with the first active slot includes:
identifying amount of data loading for each session in the first active slot;
obtaining first weighted utilization for the first active slot in accordance with the session count and the amount of data loading for each session in the first active slot; and
decreasing the first utilization count in response to the first weighted utilization.

17. A method for load balancing a network node, comprising:
increasing a first session count when a subscription session requested by a subscriber is established in a first line card coupled with a first active slot;
determining whether accumulated value of the first session count has reached to a predefined value of a discrete unit;
increasing first utilization count associated with the first active slot in a first active table when the first session counter reaches the discrete unit;
sorting the first active slot table based on the first utilization count and moving least loaded slot on top of the first active slot table; and
assigning a newly requested subscription session to a line card indicated on the top of the first active slot table.

18. The method of claim 17, further comprising:
copying content of the first active slot table to a second active slot table associated with a second active slot; and
building a session based on packet data protocol ("PDP") context in accordance with a request from a user.

19. The method of claim 18, wherein increasing a first session count includes adding one (1) to the session count when a network connection is established at a gateway GPRS support node ("GGSN").

20. The method of claim 18, wherein determining whether accumulated value of the first session count has reached to a predefined value of a discrete unit includes identifying whether the accumulated value has reached 100,000.

* * * * *